(12) United States Patent
Leclerc et al.

(10) Patent No.: US 12,474,300 B2
(45) Date of Patent: Nov. 18, 2025

(54) LIFT-OFF COMPENSATED EDDY CURRENT SYSTEM

(71) Applicant: Evident Canada, Inc., Québec (CA)

(72) Inventors: Rémi Leclerc, Quebec City (CA); Benoit Lepage, L'Ancienne-Lorette (CA)

(73) Assignee: Evident Canada, Inc., Québec (CA)

( * ) Notice: Subject to any disclaimer, the term of this patent is extended or adjusted under 35 U.S.C. 154(b) by 147 days.

(21) Appl. No.: 18/264,623

(22) PCT Filed: Jan. 19, 2022

(86) PCT No.: PCT/CA2022/050070
§ 371 (c)(1),
(2) Date: Aug. 8, 2023

(87) PCT Pub. No.: WO2022/170417
PCT Pub. Date: Aug. 18, 2022

(65) Prior Publication Data
US 2024/0118240 A1    Apr. 11, 2024

Related U.S. Application Data

(60) Provisional application No. 63/201,218, filed on Apr. 19, 2021, provisional application No. 63/147,486, filed on Feb. 9, 2021.

(51) Int. Cl.
G01N 27/90    (2021.01)
G01N 27/60    (2006.01)
G01N 27/904   (2021.01)

(52) U.S. Cl.
CPC ............... *G01N 27/9006* (2013.01)

(58) Field of Classification Search
CPC ... G01N 27/9046; G01N 27/90; G01N 27/904
See application file for complete search history.

(56) References Cited

U.S. PATENT DOCUMENTS

| 4,808,927 A | 2/1989 | Cecco et al. |
| 5,371,461 A | 12/1994 | Hedengren |
| 5,399,968 A * | 3/1995 | Sheppard ............. G01N 27/904 324/262 |

(Continued)

FOREIGN PATENT DOCUMENTS

| CA | 2312101 A1 | 12/2001 |
| WO | WO-2022170417 A1 | 8/2022 |

OTHER PUBLICATIONS

"International Application Serial No. PCT/CA2022/050070, International Search Report mailed Mar. 17, 2022", 4 pgs.

(Continued)

*Primary Examiner* — Huy Q Phan
*Assistant Examiner* — Temilade S Rhodes-Vivour
(74) *Attorney, Agent, or Firm* — Schwegman Lundberg & Woessner, P.A.

(57) ABSTRACT

Techniques for compensating the sensitivity variations induced by lift-off variations for an eddy current array probe. The techniques use the eddy current array probe coils in two separate ways to produce a first set of detection channels and a second set of lift-off measurement channels without the need to add coils 5 dedicated to the lift-off measurement operation.

10 Claims, 12 Drawing Sheets

(56) References Cited

U.S. PATENT DOCUMENTS

| | | | |
|---|---|---|---|
| 7,960,969 | B2 | 6/2011 | Mouget et al. |
| 8,013,600 | B1 | 9/2011 | Yepez, III et al. |
| 10,324,062 | B2 | 6/2019 | Denenberg et al. |
| 2003/0173958 | A1* | 9/2003 | Goldfine ............... G01N 27/904 73/779 |
| 2010/0079157 | A1* | 4/2010 | Wincheski ........... G01N 27/904 324/699 |
| 2010/0085045 | A1* | 4/2010 | Sheila-Vadde ..... G01N 27/9006 324/242 |
| 2012/0007595 | A1* | 1/2012 | Lepage ................ G01N 27/904 324/239 |
| 2013/0249540 | A1 | 9/2013 | Lepage |
| 2016/0282307 | A1* | 9/2016 | Ye ...................... G01N 27/9006 |
| 2017/0219528 | A1 | 8/2017 | Horn et al. |
| 2018/0143161 | A1 | 5/2018 | Lepage |

OTHER PUBLICATIONS

"International Application Serial No. PCT/CA2022/050070, Written Opinion mailed Mar. 17, 2022", 6 pgs.

"European Application Serial No. 22752023.6, Response filed Feb. 6, 2024 to Communication pursuant to Rules 161(1) and 162 EP", 1 pgs.

"European Application Serial No. 22752023.6, Extended European Search Report mailed Oct. 4, 2024", 8 pgs.

"European Application Serial No. 22752023.6, Response filed Dec. 30, 2024 to Extended European Search Report mailed Oct. 4, 2024", w claims, 8 pgs.

"Canadian Application Serial No. 3,209,814, Examiners Rule 86(2) Report mailed Feb. 3, 2025", 5 pgs.

"Canadian Application Serial No. 3,209,814, Response filed May 30, 2025 to Examiners Rule 86(2) Report mailed Feb. 3, 2025", w claims, 14 pgs.

* cited by examiner

Coil Location on PCB top    Bottom

LIFT-OFF COMPENSATED EDDY CURRENT SYSTEM

CLAIM OF PRIORITY

This application is a U.S. National Stage filing under 35 U.S.C. 371 from International Application No. PCT/CA2022/050070, titled "LIFT-OFF COMPENSATED EDDY CURRENT SYSTEM" to Rémi Leclerc et al., filed on Jan. 19, 2022, which claims the benefit of priority of U.S. Provisional Patent Application Ser. No. 63/201,218, titled "LIFT-OFF COMPENSATED MULTI-FREQUENCY EDDY CURRENT SYSTEM FOR INDICATING A FLAW IN A MATERIAL UNDER TEST" to Rémi Leclerc et al., filed on Apr. 19, 2021, and the benefit of priority of U.S. Provisional Patent Application Ser. No. 63/147,486, titled "LIFT-OFF COMPENSATED MULTI-FREQUENCY EDDY CURRENT SYSTEM FOR INDICATING A FLAW IN A MATERIAL UNDER TEST" to Rémi Leclerc et al., filed on Feb. 9, 2021, the entire contents of each being incorporated herein by reference.

RELATED APPLICATIONS

This application is related to U.S. patent application Ser. No. 13/427,205, titled "EDDY CURRENT ARRAY PROBE AND METHOD FOR LIFT-OFF COMPENSATION DURING OPERATION WITHOUT KNOWN LIFT REFERENCES to Benoit Lepage, filed on Mar. 22, 2012, and related to U.S. patent application Ser. No. 15/872,719, titled "EDDY CURRENT ARRAY PROBE AND METHOD FOR LIFT-OFF COMPENSATION DURING OPERATION WITHOUT KNOWN LIFT REFERENCES to Benoit Lepage, filed on Jan. 16, 2018, the entire contents of each being incorporated herein by reference.

FIELD OF THE DISCLOSURE

This disclosure relates to non-destructive testing and inspection systems (NDT/NDI), and more particularly to Eddy Current Array technology (ECA), eddy current probes etched on printed circuit board and lift-off compensation.

BACKGROUND

Eddy current inspection is commonly used to non-destructively detect flaws in surfaces of manufactured components fabricated from a conductive material, such as bars, tubes, and special parts for automotive, aeronautic or energy industries. Over the years, eddy current sensors have been designed with different configurations and shapes.

Typical eddy current sensor configurations include impedance bridge, pitch-catch (alternatively called reflection or transmit-receive) and differential configurations, but can also include more complex combinations such as pitch-catch with differential receivers, multi-differential, etc. An even greater variety of probe shapes has been developed over the years, with a few of them being truly successful configurations, as known in the industry.

One such known first type of eddy current sensor, named orthogonal, cross-wound or plus point, is mounted on a cube or a cross-shaped core, with two coils wrapped orthogonally to each other. One of the coils is the driver and is wrapped perpendicularly to the other coil core axis, used as the receiver. On this particular orthogonal sensor, the driver and the receiver coils are positioned perpendicularly to the component to inspect. This feature decouples the driver magnetic field from the sensitive axis of the receiver, thereby reducing the sensitivity of the receiver to surface noise that does not represent a flaw.

Many eddy current sensors generate a very strong signal representative of variations in the distance (lift-off) between the sensor and inspected part. Such sensors referred to herein as being of a second type are commonly referred to as having an "absolute" response because they provide relatively direct information of the coupling between the sensor and the inspected component. On the other hand, a few configurations (including the orthogonal and some differential arrangements) only exhibit a reduction in sensitiveness with increasing lift-off. Such configurations are then ideal to conduct an inspection over irregular parts (such as welds or hot rolled bars) or when the inspection environment cannot provide a perfectly stable lift-off.

Still, even for orthogonal and differential sensors, the potential sensitivity variations related to corresponding lift-off variations are an important limiting factor for the detection capabilities of eddy current sensors. This problem is even more important for eddy current array probes which include several independent eddy current channels because it is easier to maintain a constant lift-off for a single sensor than for a sensor array. Various terms used herein have the following definitions:

(i) An eddy current sensor is a complete coil arrangement capable of generating eddy currents in the test part and receiving the magnetic field produced by those eddy currents;
(ii) An Eddy Current Array (ECA) probe is a complete assembly including several sensors; and
(iii) An Eddy Current Array (ECA) channel is a unique combination of sensor and test conditions (frequency, gain, etc), such that a thirty two sensor ECA probe driven with two test frequencies would generate, for example, sixty four channels.

SUMMARY OF THE DISCLOSURE

The disclosure describes, among other things, techniques for compensating the sensitivity variations induced by corresponding lift-off variations for an eddy current array probe. Various techniques use the eddy current array probe coils in two separate ways to produce a first set of detection channels and a second set of lift-off measurement channels without the need to add coils dedicated to the lift-off measurement operation. Another aspect of the disclosure provides an improved calibration process which combines the detection and lift-off measurement channel calibration on a simple calibration block including a reference defect without the need of a pre-defined lift-off condition.

In some examples, an EC probe array system for detecting flaws in a test object is provided. That system includes:
(a) an EC coil arrangement including:
(i) a plurality of orthogonal EC sensors arranged in channels and configured to induce eddy currents in the test object and to sense and output first signals representative of flaws in the test object;
(ii) a plurality of absolute EC sensors configured to produce from the test object second signals indicative of a lift-off distance of said orthogonal and absolute EC sensors relative to said test object, said EC coil arrangement being configured so that a pre-determined or given ratio is established between said second signals and said first signals, at different lift-off distances;

(b) a setup table comprising calibration values for said orthogonal EC sensors with corresponding lift-off compensation values for each of said channels based on said second signals; and (c) a processor or acquisition unit responsive to said calibration and lift-off compensation values in said setup table and to the second signals and configured to convert said first signals obtained from said orthogonal EC sensors during actual testing of said test object, so as to obtain third signals which are representative of said Eddy Currents in said test object, said third signals being substantially independent of actual lift-off distances prevailing between said EC sensors and said test object at the time of obtaining said first signals during actual testing.

In some configurations, the EC coil arrangement is provided on a printed circuit board. The EC coil arrangement may comprise coils configured as overlapped coils and configured as driver and receiver coils. The processor may drive the orthogonal absolute channels sensors simultaneously and with a pitch-catch type configuration. Also, in some examples, orthogonal and absolute channels may use the same sets of drive coils to enable faster acquisition and more stable signals. In other examples, such as described below with respect to FIG. 13, the receiving coils can be shared rather than the drive coils.

The aforementioned EC coil arrangement can be utilized to perform a probe array system setup including setting at least a gain value and preferably a phase rotation value on each orthogonal channel relative to a known calibration notch using the orthogonal EC sensors. Relative to each orthogonal channel, an amplitude vector is also obtained by using the absolute EC sensors and gain and absolute vector length values are stored in a setup table. Subsequent to preparing the setup table, actual testing is conducted by acquiring data for the orthogonal and absolute channels to obtain raw orthogonal data and raw absolute data for each channel. Amplitude vector lengths are calculated and the raw orthogonal data is compensated for the lift-off effects utilizing the absolute vector lengths and/or calibration gain values to obtain compensated data for the object being tested.

In some existing techniques, such as described in commonly-assigned U.S. patent application Ser. No. 13/427,205, a single driver can generate a single driver signal that can be used to generate two signals by the coil arrangement—a detection channel signal and a lift-off channel signal—that can be separated using two sensors in a backend circuit. The present inventors have recognized the desirability of using two drivers that can generate two driver signals at different excitation frequencies, which can reduce the cost of the acquisition electronics by a factor of two for a typical system. These two driver signals can produce a mixed signal by the coil arrangement that can be detected by a single sensor in a backend circuit. The mixed signal produced by the coil arrangement can be separated after the acquisition by demodulation, for example, resulting in the detection and lift off signals.

DETAILED DESCRIPTION

In some existing techniques, such as described in commonly-assigned U.S. patent application Ser. No. 13/427,205, a single input driver can generate a single driver signal that can be used to generate two signals by the coil arrangement—a detection channel signal and a lift-off channel signal—that can be separated using two sensors in a backend circuit. The present inventors have recognized the desirability of using two drivers that can generate two driver signals at different excitation frequencies. As described below with respect to FIGS. 13 and 14, these two driver signals can produce a mixed signal by the coil arrangement that can be detected by a single sensor in a backend circuit. The mixed signal produced by the coil arrangement can be separated after the acquisition by demodulation, for example, resulting in the detection and lift off signals.

Figure 1:
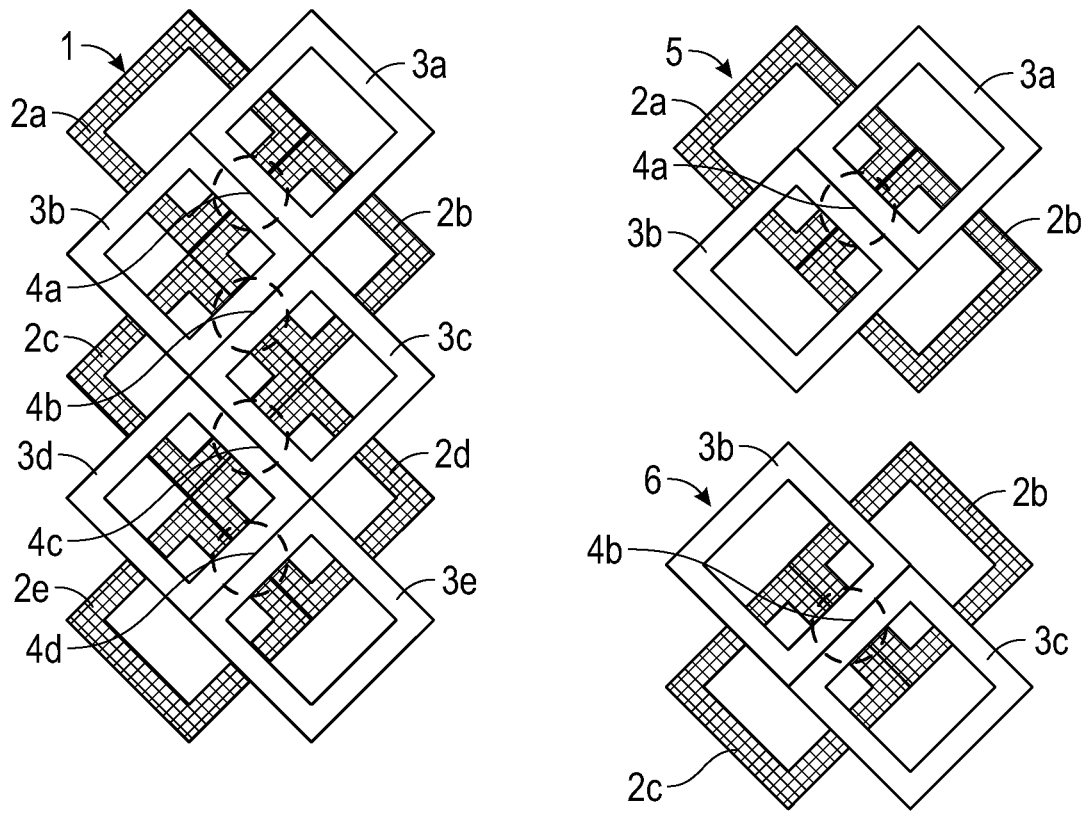
FIG. 1 illustrates a simplified representation of the prior art flat shaped orthogonal eddy current array probe built on a two-layer printed circuit board.
Figure 1:
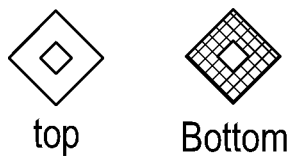

Related patent application Ser. No. 12/832,620 describes how to build an ECA probe on a printed circuit board. The contents of patent application Ser. No. 12/832,620 and of Ser. No. 12/847,074 are incorporated by reference herein. The structure presented in application Ser. No. 12/832,620 is disposed on two PCB layers. A simplified representation of such structure is shown on FIG. 1 for a four sensor orthogonal ECA probe 1 including five driver coils (2a to 2e) and five receiver coils (3a to 3e) resulting in four sensitive spots (4a to 4d) with orthogonal sensor response. The coil arrangement (such as 5 and 6) that generates orthogonal sensor response will be referenced to as "orthogonal channels" in this document.

Figure 2:
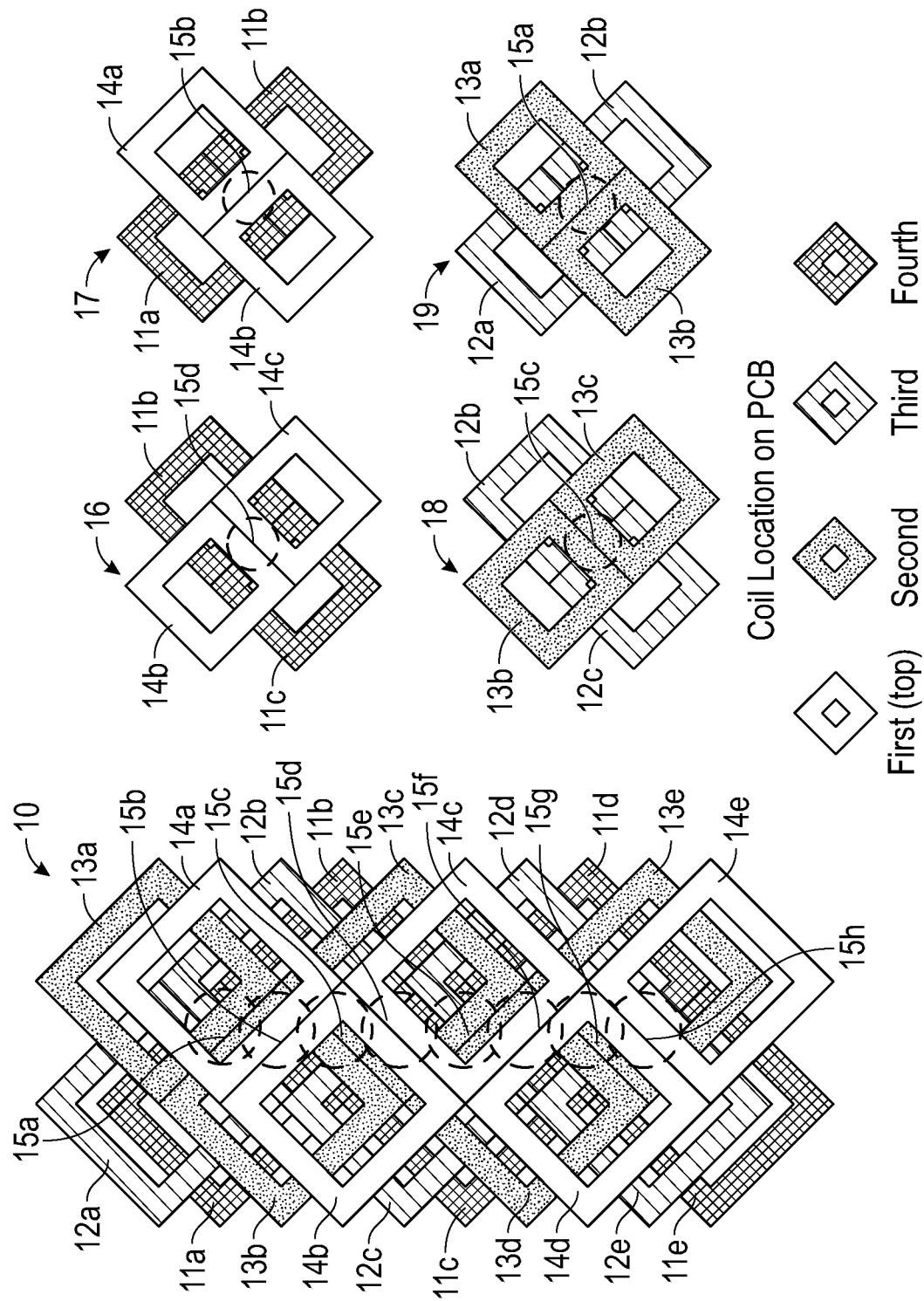
FIG. 2 is the four-layer printed circuit board extension of the FIG. 1 representation and the illustration of the possible shape of the orthogonal channels.

As first stated in paragraph [0035] of the mentioned application, it is also possible to use the multi-layer capabilities of the printed circuit boards to increase the resolution of the orthogonal ECA probe. FIG. 2 illustrates a four-layer version of the ECA probe 10 built using this principle. The two bottom layers (11a to 11e and 12a to 12e) are connected to driver signals while the two upper layers (13a to 13e and 14a to 14e) are connected to receiver signals in order to generate orthogonal channels such as 16, 17, 18 and 19. The bottom layer coils 11a to 11e operate with the top layer coils 14a to 14e to generate a first set of orthogonal channels while coils 12a to 12e operate with the coils 13a to 13e to generate a second set of orthogonal channels.

Figure 3:
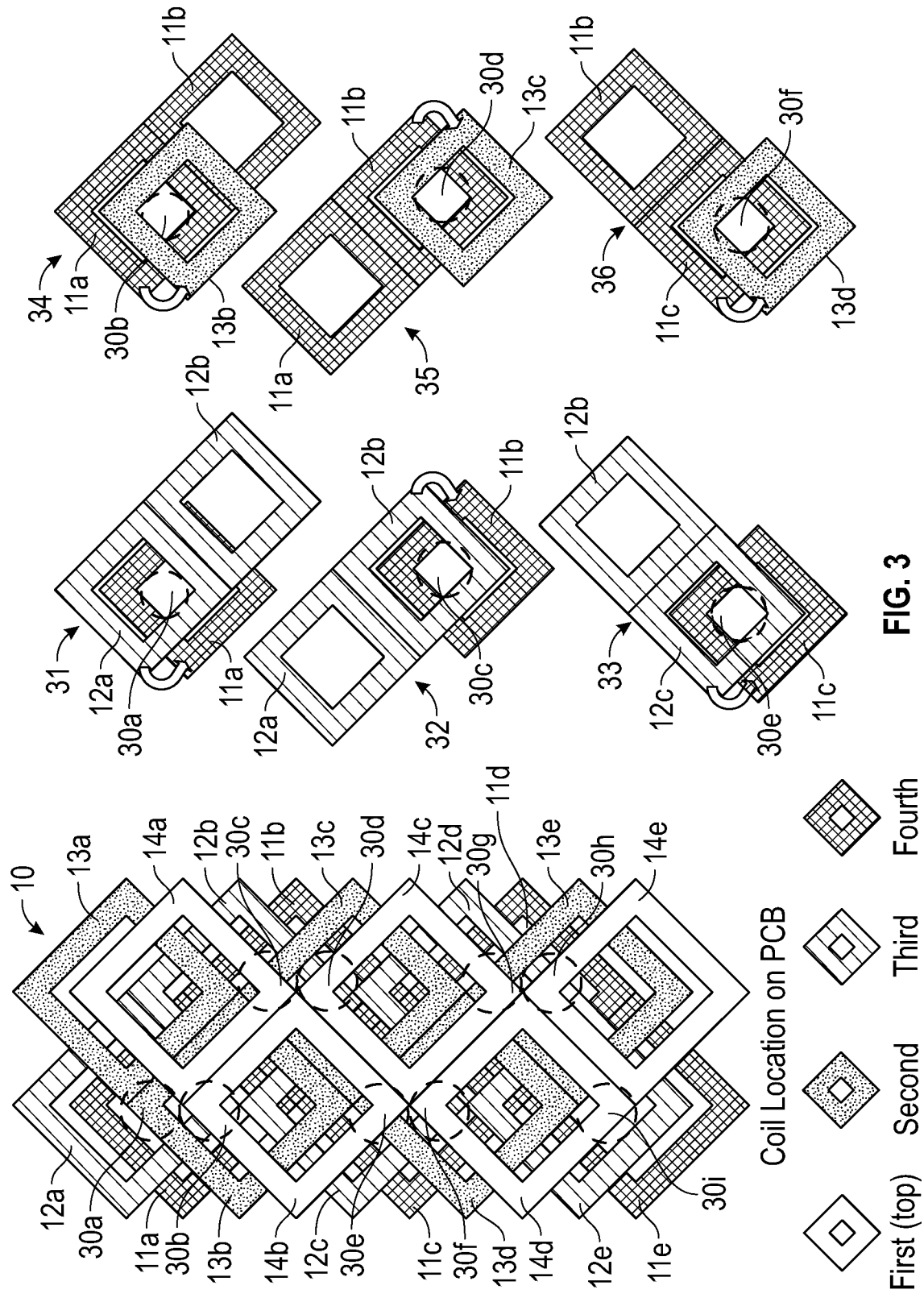
FIG. 3 illustrates the absolute channels created for the probe structure of FIG. 2.

From the probe structure shown on FIG. 2, it is an object of this disclosure to teach how to obtain absolute channels for monitoring the lift-off. FIG. 3 illustrates how these channels are built from the structure of probe 10. Some coils, partially overlapping the driver coils, are connected as receivers. For example, pitch-catch sensor configuration 36 uses two fourth layer coils (11b and 11c) as a driver and one second layer coil (13d) as receiver. Using the techniques of FIG. 13, described below, the configuration of FIG. 3 can be flipped such as to have the second layer coil (13d) as a driver and the two fourth layer coils (11b and 11c) as receivers, which connect to a single differential input. It should be noted that flipping the transmitter and receivers is possible for any eddy current system based on Lorentz reciprocity.

In another example, pitch-catch configuration 33 uses two third layer coils (12b and 12c) as receivers and one fourth layer coil (11c) as a driver. As a matter of fact, the same coil can be used as a driver and a receiver through the sequence (as already disclosed in prior art U.S. Pat. No. 6,344,739). Using coil combinations similar to 31, 32, 33, 34, 35 and 36 for the whole probe 10, we obtain a set of nine sensitive areas (30a to 30i) with absolute sensor response extending over the whole probe length. The coil arrangements (such as 31 to 36) that generate absolute sensor response will be referred to herein as "absolute channels" in this disclosure.

Figure 4:
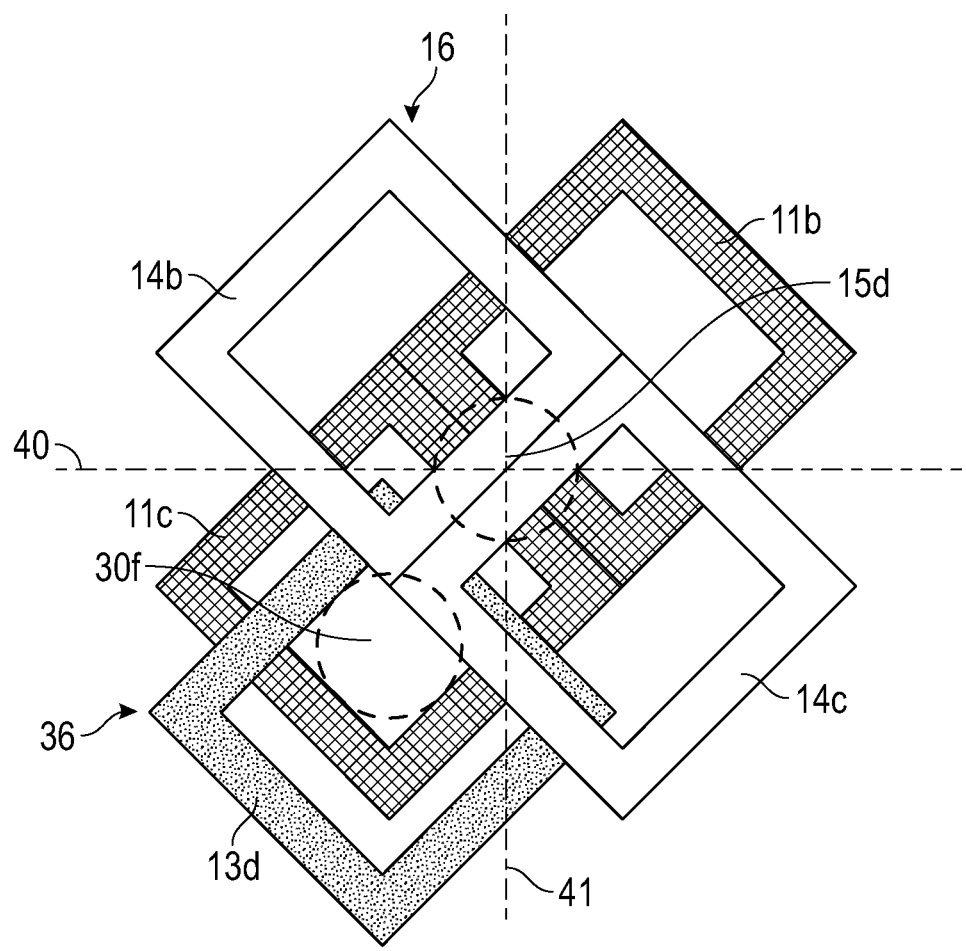
FIG. 4 shows that cracks affecting the orthogonal channels will not affect the corresponding absolute channel.

The newly created absolute channels are inherently very sensitive to lift off, because the proximity of the inspected part will directly impact the magnetic field flux in the shared area of the driver and receiver coils (11c and 13d for example) defining the sensitive area (30f for example) of the absolute channel (36 for example). FIG. 4 also demonstrates that the new absolute channel will not be sensitive to a longitudinal 41 or transversal 40 crack to be detected by the orthogonal channel because the absolute channel sensitive area (30f for example) is not in line with longitudinal or transverse crack when this crack is located on the orthogonal channel sensitive area (15d for example). So, the described structure makes it possible to substantially completely decouple the lift-off and crack measurements for this probe.

Figure 5:
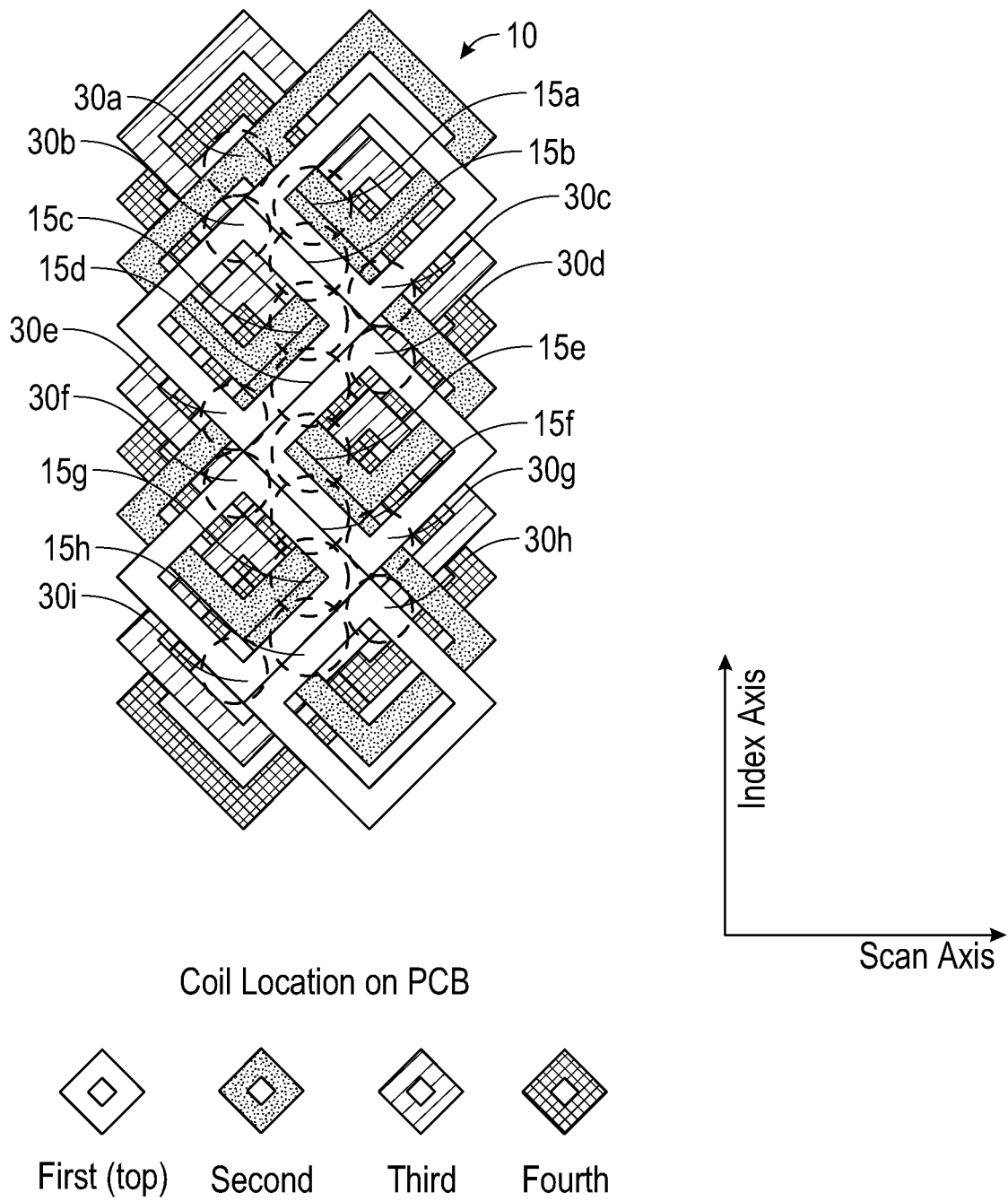
FIG. 5 shows the absolute and orthogonal sensitive area on the four layer probe of FIG. 2.

As further demonstrated on FIG. 5, each orthogonal channel sensitive area is located exactly in between two absolute channels sensitive areas on the index axis. So, we can use the average value between these two absolute channels to produce an approximation of the lift-off conditions for the corresponding orthogonal channel.

It must be understood that the selection of coils to be used in the absolute channel construction was made in order to acquire the orthogonal and absolute channels simultaneously and with a pitch-catch type configuration which is naturally more stable than an impedance bridge. For example, orthogonal channel 16 and absolute channel 36 use the same set of two receiver coils 11b and 11c. So, these two channels can be acquired simultaneously by the acquisition electronics. This configuration is advantageous because it can allow a faster acquisition (through simultaneous operation) and a stable signal, but it is not a mandatory requirement so there will be other possible configurations.

Now that we have described means for building channels for detection (orthogonal channels in some examples) and lift-off monitoring (absolute channels made out from a pitch-catch sensor arrangement in some examples), we describe how these signals are processed in order to obtain a lift-off compensated eddy current probe array without the use of a lift-off reference.

Figure 6:
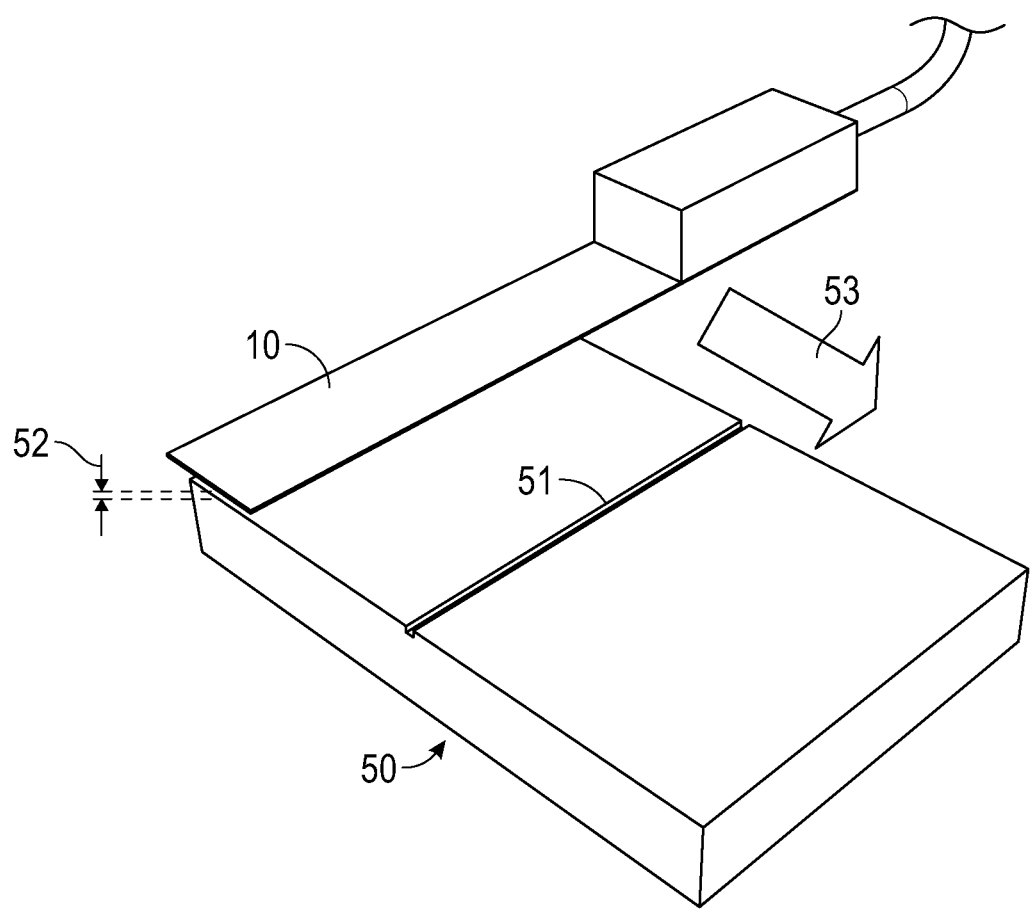
FIG. 6 illustrates the scan of a calibration block including a reference notch and a probe lift-off.

As shown on FIG. 6, a reference block 50 comprising a long transversal reference notch 51 is scanned in direction 53 with a given lift-off 52. The probe is first nulled in AIR to generate a reference point for an infinite lift off condition, which will become important later in this discussion. The block 50 is then scanned four times with increasing lift off (in the example; Lift-off A=0 mm; Lift-off B=0.63 mm; Lift-off C=1.27 mm; Lift-off D=1.9 mm) to provide the required background information.

Figure 7:
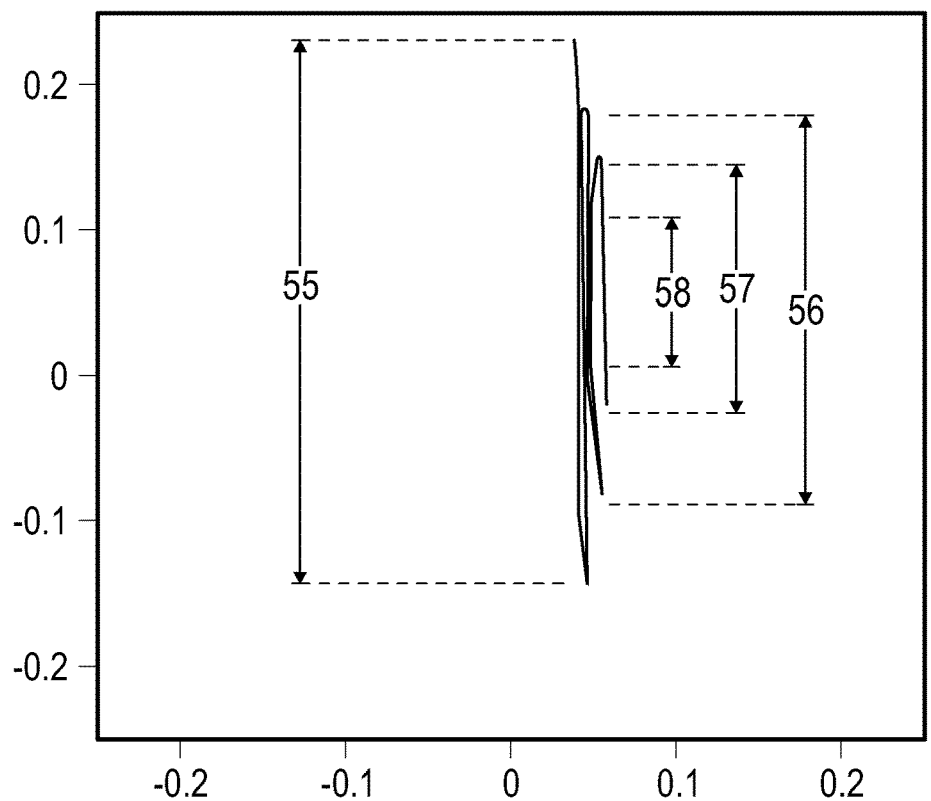
FIG. 7 is the impedance plane results obtain on the orthogonal channels from the scan of FIG. 6 block with four defined lift off condition.

FIG. 7 shows the impact of lift-off on the reference defect detection amplitude on orthogonal channel 16 impedance plane display. In this case, defect amplitude 55 is obtained with lift-off A, defect amplitude 56 is obtained with lift-Off B, defect amplitude 57 is obtained with lift-off C and defect amplitude 58 is obtained with lift-off D.

Figure 8:
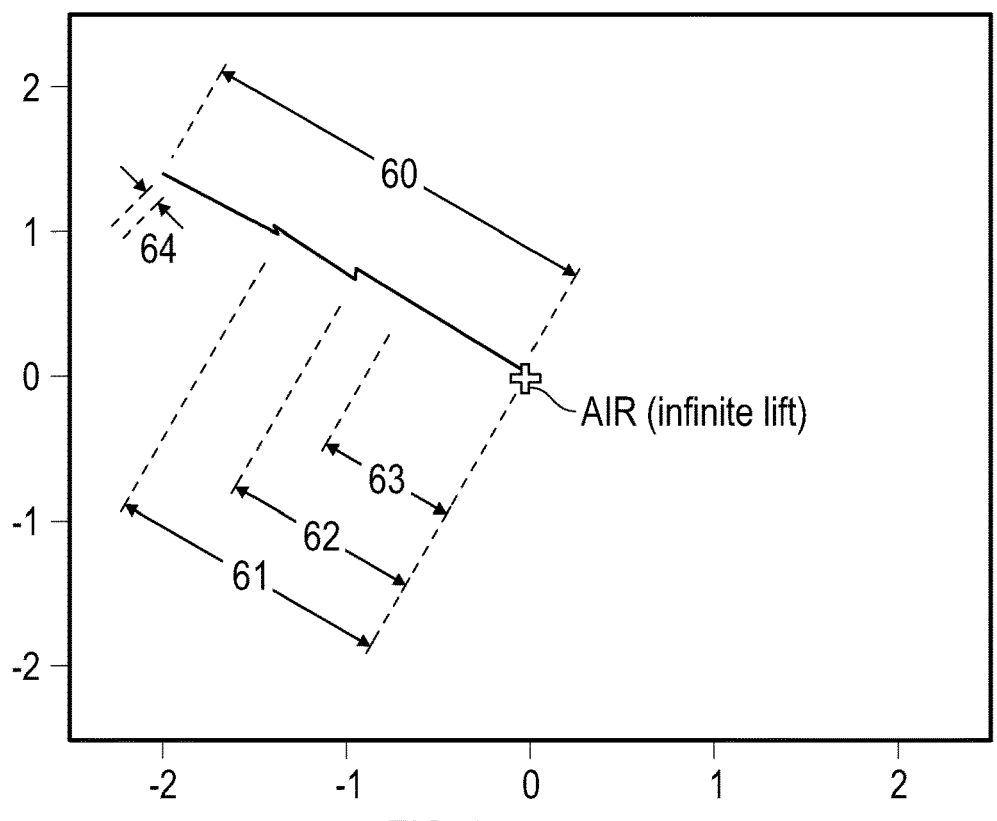
FIG. 8 is the impedance plane results obtain on the absolute channels from the scan of FIG. 6 block with four defined lift off condition.

FIG. 8 shows the impact of lift-off on absolute channel 36 impedance plane display. In this case, the total signal amplitude vector 60 results from lift-off A, the total signal amplitude vector 61 results from lift-off B, the total signal amplitude vector 62 results from lift-off C and the total signal amplitude vector 63 results from lift-off D. It is interesting to note that reference notch 51 generates very weak signals on FIG. 8 compared to the strong lift-off signal. For example, with lift A, defect amplitude 64 is orders of magnitude lower than the corresponding total signal amplitude vector 60 resulting from lift A. This is a desirable behavior since we want to use the absolute channels for lift-off monitoring only.

Figure 9:
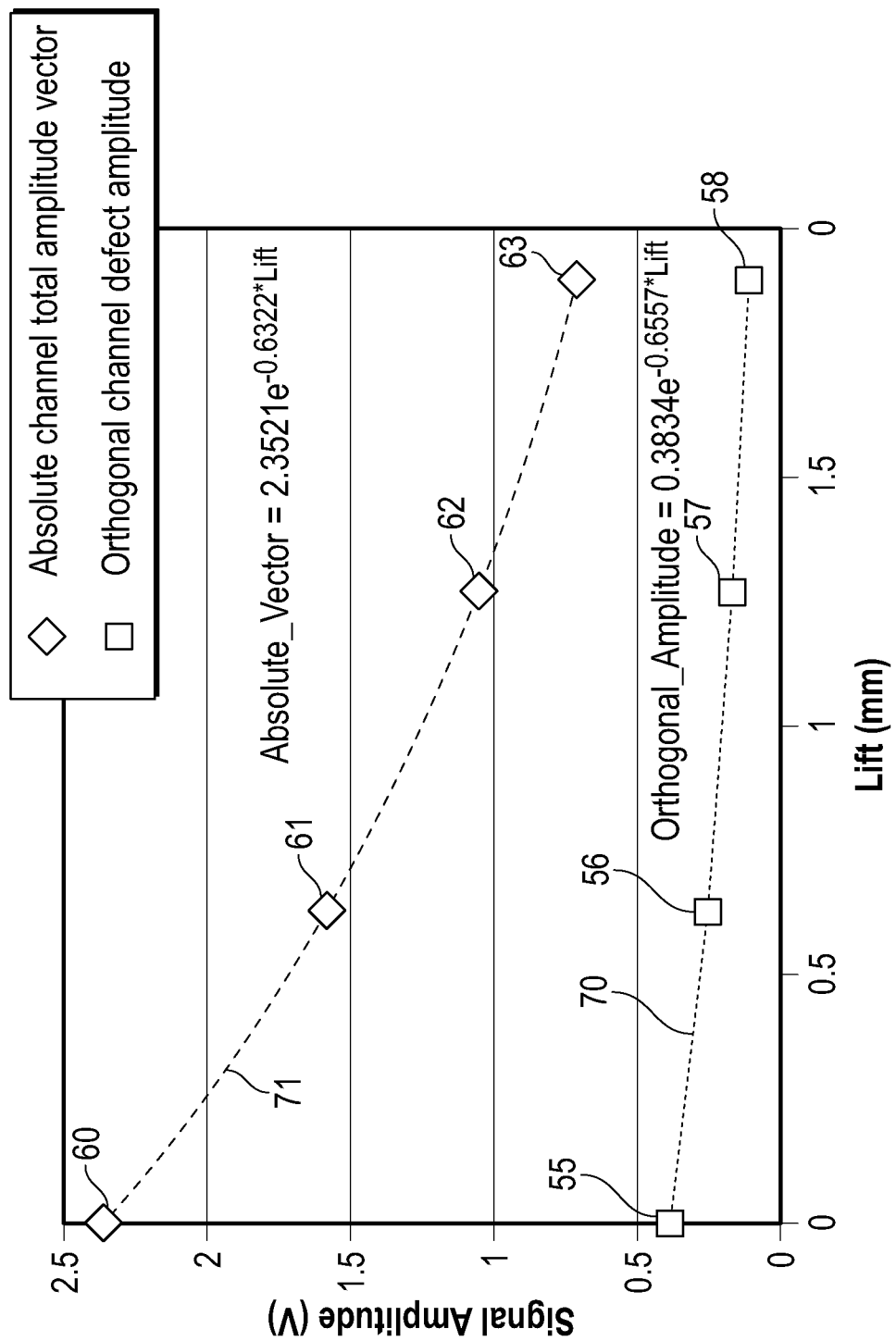
FIG. 9 proposes an amplitude-based analysis of the test signals shown on FIG. 7 and FIG. 8.

FIG. 9 shows a graph representing a combined view of the defect amplitude readings 55, 56, 57, 58 on the orthogonal channels and the total signal amplitude vector readings 60, 61, 62 and 63 on the absolute channels relative to the lift-off conditions. As seen in the figure, both data series can be fitted by exponential curves 70 and 71. Moreover, the shape of curves 70 and 71 (which is defined by the exponent) is almost the same ($e^{-0.6322*Lift}$ vs. $e^{-0.6557*Lift}$ in this example). This observation is very important because it means the ratio "Ortho_Amplitude(Lift)/Abs_Vector(Lift)" is almost independent of the lift. For example: $0.3834*e^{-06557*Lift}/2.3521$ $e^{-0.6322*Lift}$=$0.163*e^{-0.0235*Lift}$ ... which is about 0.2 dB/mm variation compared to about 5.7 dB/mm for the orthogonal channel. This later observation forms the foundation of the signal processing method used to implement various techniques of this disclosure. For the following discussion we will approximate "Ortho Amplitude(Lift)/Abs_Vector(Lift)" as being a constant, pre-determined value totally independent of lift-off. It must be understood that the use of the same coil set for defect detection and lift-off monitoring contributes to having similar shaped curves, since the shape of the curve is provided by the magnetic coupling between coils and the inspected part. Thus, by dynamically comparing the orthogonal and absolute amplitudes at each measured point (channel), the orthogonal amplitude can be connected for the actual prevailing lift-off during each measurement, without specific knowledge of the lift-off amount, per se.

Figure 10:
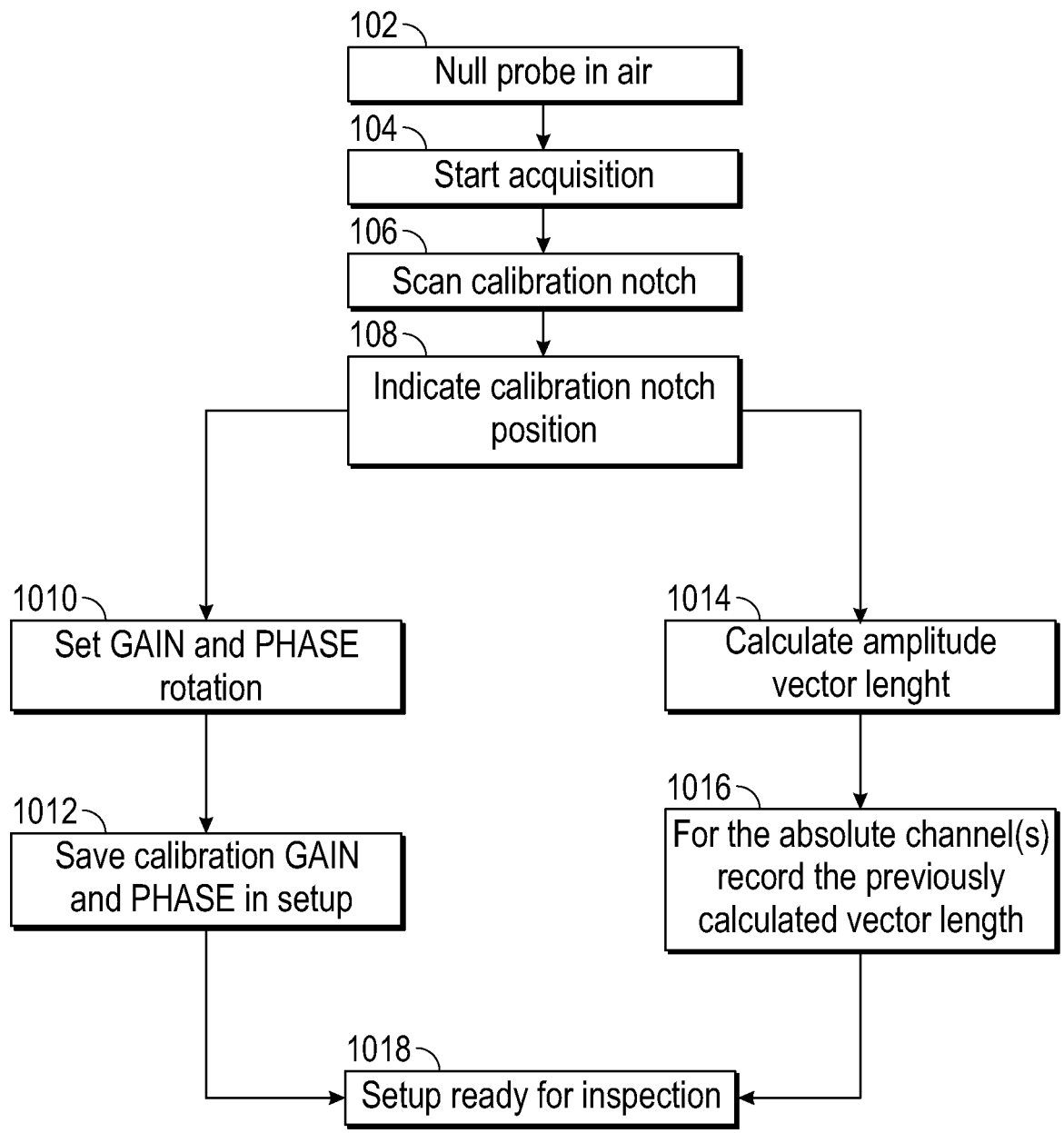
FIG. 10 is a flowchart describing the proposed calibration method.

We now turn our attention to FIG. 10, which describes how the probe is to be calibrated with a reference notch such as 51 but without a known reference lift-off. We first NULL the probe in AIR, (Step 102) start the acquisition (Step 104), scan the reference notch (Step 106) and define the notch position by manually or automatically indicating where the notch signal begins and ends (Step 108). At this point, the information we have is equivalent to the signals presented in FIG. 8 and FIG. 7 but for a single unknown lift-off. In other words, if notch 51 is scanned in the calibration process with lift-off B, the system should be able to read defect amplitude 56 and total amplitude vector 61 but the actual value of lift-off B will be unknown to both the acquisition system and the user.

The information available at this point is first used to calibrate the orthogonal channels by applying a calibration GAIN and ROTATION on the raw signal (Step 1010), in order to reach a pre-defined value for the reference defect 51. This pre-defined value (which typically includes both an angular and amplitude target) is common to all orthogonal channels and thus makes it possible to obtain a uniform detection of the reference defect 51 for all orthogonal channels. The calibration GAIN and ROTATION for each orthogonal channel is saved in the setup (Step 1012).

Simultaneously, we use the information generated in [0046] on the absolute channels to calculate the vector length between AIR and the signal's baseline obtained on the calibration block 50 (Step 1014). A single absolute vector length value (which could in fact be the average between two absolute channels or other absolute channel combinations adapted to the probe and application) is saved in the setup and associated with its corresponding orthogonal channel. For example, in probe 10, if we use absolute channels at position 30*a* and 30*b* to compensate the lift-off for the orthogonal channel at position 15*a* we could average absolute channels at position 30*a* and 30*b* and save this pre-determined value in the setup with reference to the channel at position 15*a*. This value will be referenced here as "Absolute_RetLenght(n,Cal_Lift)" where "n" is the orthogonal channel #identifier and "Cal_Lift" is the lift-off condition present during calibration (Step 1016).

Figure 11:
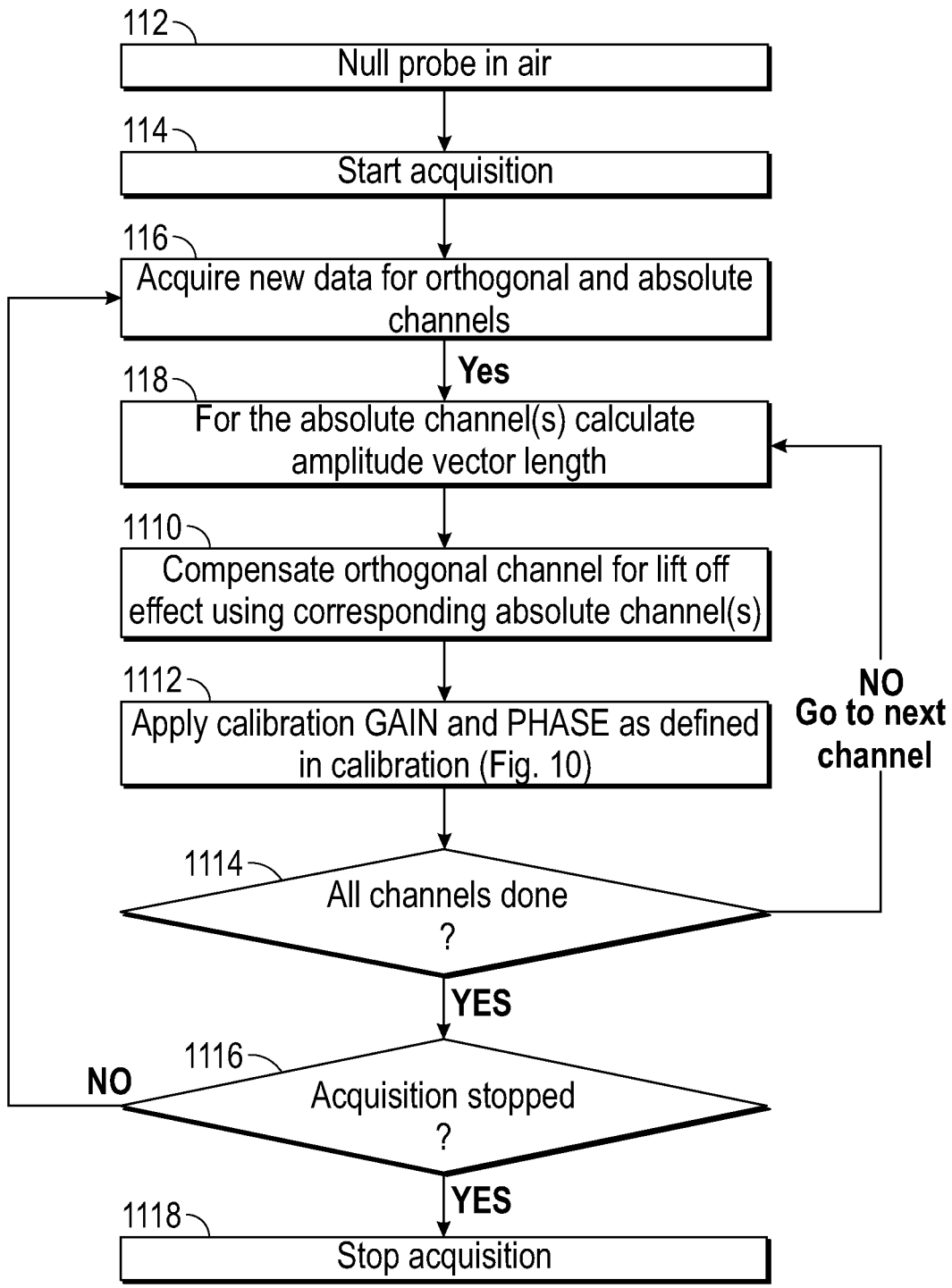
FIG. 11 is a flowchart describing the proposed signal processing method.

Now looking at FIG. 11, we will use the information now included in the calibration file and the properties of the "Ortho_Amplitude(Lift)/Abs_Vector(Lift)" ratio to generate a lift compensated orthogonal channel. The process described on FIG. 11 is applied dynamically (during the acquisition) but could easily be applied in post-processing as well (after the acquisition). The first step of the process is, again, to NULL the probe in AIR (Step 112) in order to have an infinite lift-off reference. After starting the acquisition (Step 114), each new data set corresponding to the impedance plane results (x,y) for one given orthogonal channel at one given scan position is processed separately (Step 116). Such data set will be referenced here as "Ortho raw(n, Lift)" where "n" is the orthogonal channel #identifier and "Lift" is the lift-off condition at the time of measuring the data set. The first step in processing is to find the absolute channel total vector length, at the current scan position, corresponding to the orthogonal channel currently being processed (Step 118). The relationship between the orthogonal and absolute channel must be the same as previously defined in calibration. This value will be referenced here as "Absolute_VLenght(n, Lift)" where "n" is the orthogonal channel #identifier and "Lift" is the lift-off condition at the time of measuring the data set.

Ortho_raw(n,Lift) is then processed with the following relationship to generate a lift-off compensated orthogonal channel reading; "Ortho_compensated(n, Cal_Lift)=(Ortho_raw(n,Lift)/Absolute_Vlenght(n,Lift))*Absolute_RefLenght(n)" (Step 1110). The generated "Ortho_compensated (n,Cal_Lift)" channel is then relatively independent of the current lift-off but is then dependent on the lift-off present during the system calibration. To remove this dependency and thus provide a completely lift off independent reading, the calibration GAIN and PHASE are applied to Ortho_compensated(n,Cal_Lift) (Step 1112), until all channels are so processed (Steps 1114, 1116 and 1118). As an end result, for a given flaw size, the system should generate a uniform defect signal amplitude no matter which orthogonal channel detects the flaw and without regard to the calibration and inspection lift-off.

Figure 12:
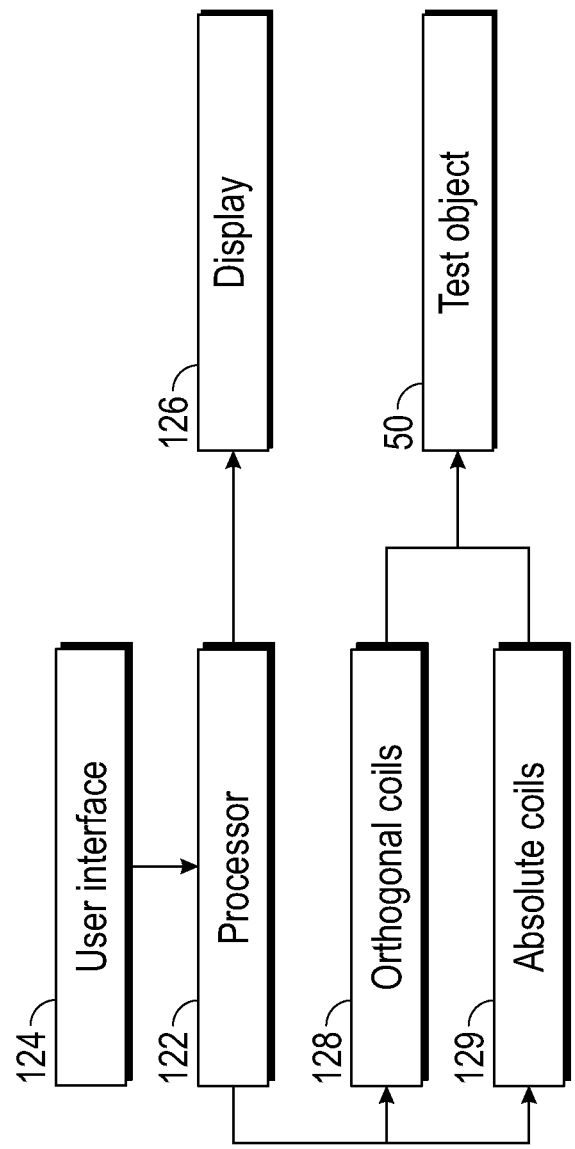
FIG. 12 shows a hardware configuration for a system that can implement various techniques of this disclosure.

FIG. 12 shows a hardware configuration of a typical system that can implement the foregoing method. The subject EC probe array system comprises a processor 122 or acquisition unit which is operable and controlled through a user interface 124 and which can display test results, commands and the like, display 126. Orthogonal sensors 128, as well as absolute sensors or coils 129 interact, electromagnetically, with the test object 50 to obtain the various signals and to implement the methods described above via software program instructions stored or loaded onto the processor 122, in a manner well known in the art.

It is important to point out that the described lift compensation method can easily be adapted to operate a multi-frequency inspection. This can be done by using a unique set of absolute channels to compensate the multi-frequency orthogonal channels.

It is also important to mention that while the figures and description describes an ECA probe with eight orthogonal sensors, the techniques described in this disclosure are applicable as long as the coil configuration makes it possible to build at least one sensor for defect detection and one sensor for lift-off measurement.

In the foregoing configurations, the EC sensors have been described and depicted as being coil windings. However, as will be recognized by one of skill in the art, other types of magnetic field sensors can be used, such as, for example, GMR ("Giant Magneto Resistance"), AMR ("Anisotropic Magneto Resistance"), or Hall Effect sensors.

In the implementations described above, a single driver is used to apply a signal to a probe structure, such as the probe structure shown in FIG. 3. The present inventors have recognized the desirability of using two drivers that can generate two driver signals at different excitation frequencies. As described below with respect to FIG. 13, these two driver signals can produce a mixed signal by the coil arrangement that can be detected by a single sensor in a backend circuit. The mixed signal produced by the coil arrangement can be separated after the acquisition by demodulation, for example, resulting in the detection and lift off signals.

Figure 13:
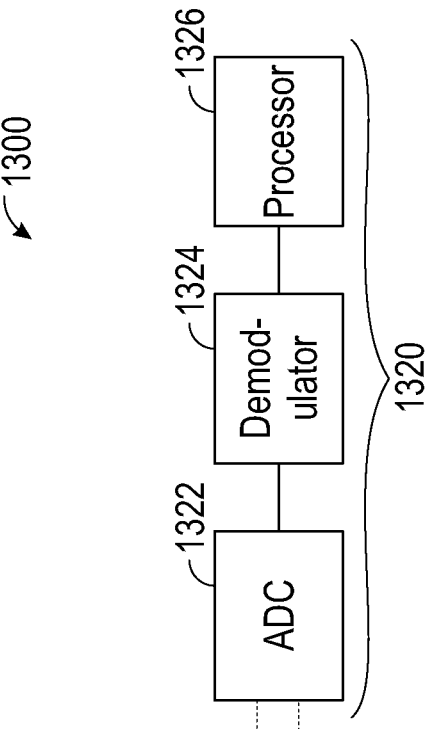
FIG. 13 is a diagram illustrating an example of a dynamic lift-off compensated multi-frequency eddy current system for indicating a flaw in a material under test.
Figure 13:
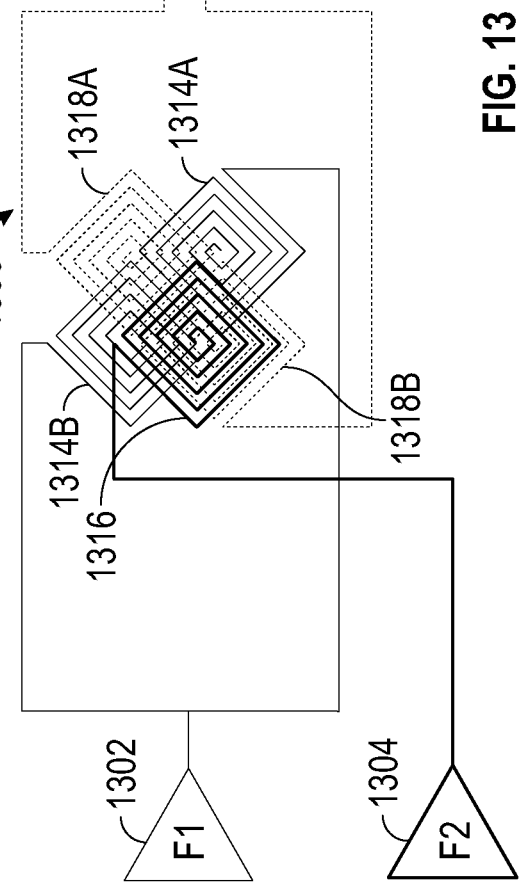

FIG. 13 is a diagram illustrating an example of a dynamic lift-off compensated multi-frequency eddy current system 1300 for indicating a flaw in a material under test. In the examples described earlier in this disclosure, the detection channel and the lift-off channel signals are both generated by the same driver signal and the separation is performed using two sensors in a back-end circuit. In FIG. 13, however, two excitation signal frequency drivers 1302, 1304 can generate corresponding driver signals at frequencies F1, F2, where frequency F1 is different from frequency F2. As a non-limiting example, frequency F1 can be about 200 kHz and frequency F2 can be about 250 kHz. The drivers 1302, 1304 can be coupled with an eddy current probe 1306.

The eddy current probe 1306 can be similar to one or more of the probes described above, such as the probe 10 of FIG. 3. Generally speaking, the eddy current probe 1306 can include one or more sets of interface coils. An example of a set of interface coils is shown in FIG. 4. For simplicity and purposes of explanation only, the eddy current probe 1306 shown in FIG. 13 is shown with a single set of interface coils, like in FIG. 4.

The eddy current probe 1306 can include one or more first interface coils 1314A, 1314B arranged to induce a first eddy current in a material in response to a first input excitation signal frequency F1 from the driver 1302. The eddy current probe 1306 can include one or more second interface coils 1316 arranged to induce a second eddy current in the material in response to a second input excitation frequency F2 that is different from the first input excitation frequency F1. In some examples, the first and second input excitation frequencies F1, F2 can be applied to first interface coils 1314A, 1314B and the second interface coil 1316 concurrently. The eddy current probe 1306 can include one or more third interface coils 1318A, 1318B arranged to sense a response signal, where the response signal is a composite response to the first eddy current and the second eddy current. The set of interface coils can include at least one orthogonal sensor and at least one absolute sensor, such as described earlier in this disclosure.

The dynamic lift-off compensated multi-frequency eddy current system 1300 can include a back-end circuit 1320 coupled with the third interface coils 1318A, 1318B. The back-end circuit 1320 can receive the response signal sensed by the third interface coils 1318A, 1318B and extract a lift-off signal and a defect signal from the response signal. The defect signal can be the result of flaws in the material, such as cracks, slag, inclusion, and step-wise cracking.

In some examples, the back-end circuit 1320 can include or can be coupled with an analog-to-digital converter (ADC) circuit 1322, a demodulator circuit 1324, and a processor 1326. In some examples, the processor 1326 can be similar to the processor 122 of FIG. 12 and can implement techniques described above, including the techniques shown in the flow diagram of FIG. 11.

The ADC circuit 1322 can receive the analog response signal sensed by the third interface coils 1318A, 1318B and generate a digital response signal at its output that represents the analog response signal. The demodulator circuit 1324 can be coupled with an output of the ADC circuit 1322 and configured to receive the digital response signal from the ADC circuit 1322. The demodulator circuit 1324 can demodulate the digital response signal to digitally extract the lift-off signal and the defect signal from the digital response signal.

Using various techniques described above, such as in FIG. 11, the processor 1326 can determine, based on the lift-off signal and the defect signal, a lift-off independent defect signal. That is, for a given flaw size, the system 1300 can generate a uniform defect signal amplitude without regard to the inspection lift-off.

Techniques described earlier in this disclosure use a single second interface coil 1316 as a receiver. However, in FIG. 13, the system 1300 can use the single second interface coil 1316 as a driver. That is, for a set of five interface coils, the techniques described earlier in this disclosure used one driver and two receivers. In FIG. 13, for a similar set of five interface coils, the present inventors have recognized that two drivers can be used, driven at slightly different frequencies, with one receiver. Then, the defect signal and lift-off signal can be extracted due to their frequency-based separation. The techniques described earlier used separate physical inputs as the separation technique. A configuration such as in FIG. 13 can reduce the number of components in the back-end circuit. For example, in FIG. 13, only a single ADC circuit is needed to produce a compensated channel, as compared to two ADC circuit using the techniques described earlier, which can reduce the cost of the system.

In some example implementations, the first interface coils 1314A, 1314B can be arranged in an orthogonal configuration with the third interface coils 1318A, 1318B to provide at least one orthogonal channel, and the second interface coils 1316 can be arranged in an absolute configuration with the third interface coils 1318A, 1318B to provide at least one absolute channel. Example configurations are shown in FIGS. 4 and 5.

As mentioned above, the system 1300 of FIG. 13 can be implemented by flipping the configuration of FIG. 3 such as to have the second layer coil (13*d*) as a driver and the two fourth layer coils (11*b* and 11*c*) as receivers, which can connect to a single differential input. It should be noted that flipping the transmitter and receivers is possible for any eddy current system based on Lorentz reciprocity. The calibration and data acquisition flow diagrams of FIGS. 10 and 11 can be used to with the system 1300 of FIG. 13.

Figure 14:
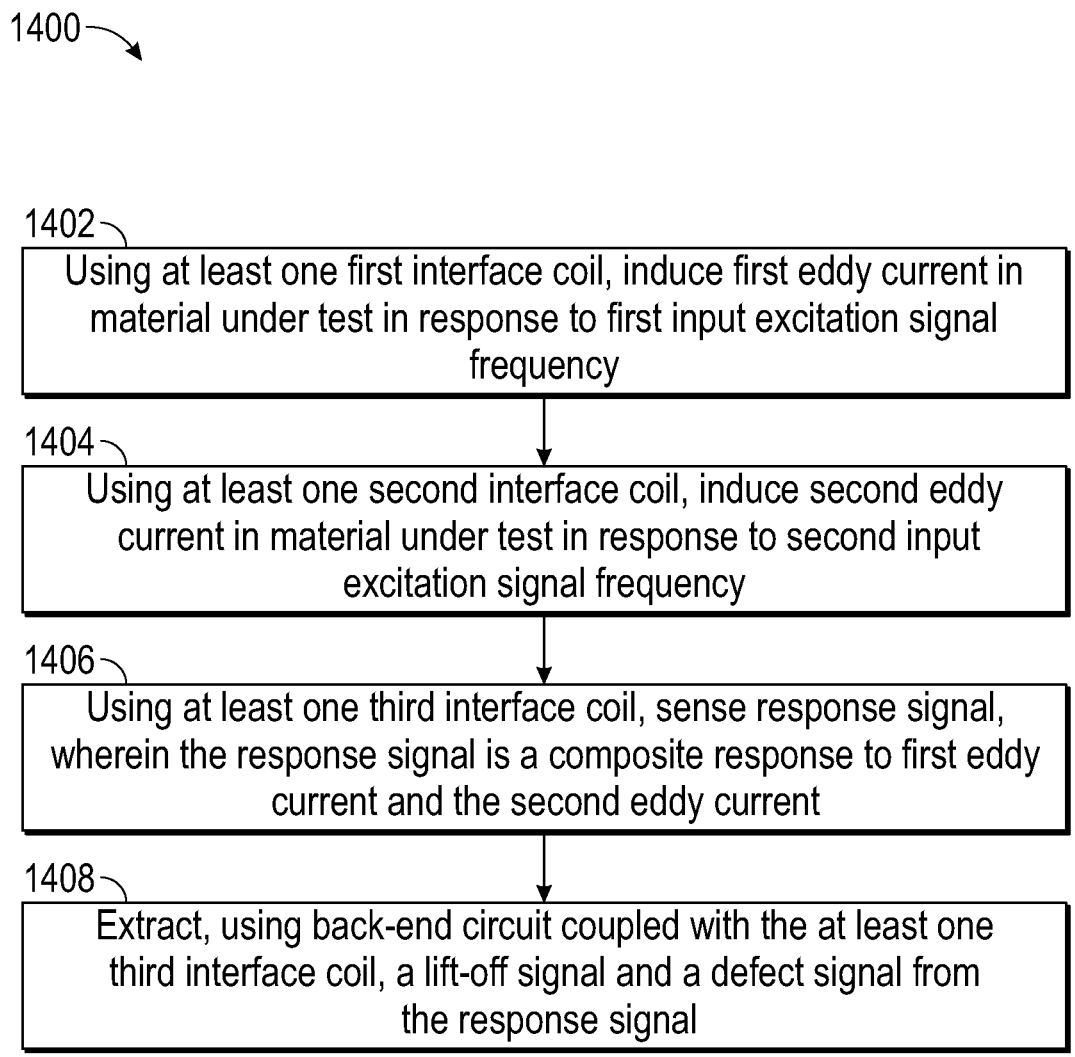
FIG. 14 is a flow diagram of an example of a multi-frequency method for indicating a flaw in a material under test.

FIG. 14 is a flow diagram of an example of a multi-frequency method 1400 for indicating a flaw in a material under test. At block 1402, the method 1400 can include using at least one first interface coil, inducing a first eddy current in the material under test in response to a first input excitation signal frequency F1. For example, the first excitation signal frequency driver 1302 can output an excitation signal frequency F1 to the one or more first interface coils 1314A, 1314B of FIG. 13 and induce a first eddy current in the material under test.

At block 1404, the method 1400 can include using at least one second interface coil, inducing a second eddy current in the material under test in response to a second input excitation signal frequency F2. For example, the second excitation signal frequency driver 1304 can output an excitation signal frequency F2 to the second interface coil 1316 of FIG. 13 and induce a second eddy current in the material under test.

At block 1406, the method 1400 can include using at least one third interface coil, sensing a response signal, wherein the response signal is a composite response to the first eddy current and the second eddy current. For example, the one or more third interface coils 1318A, 1318B of FIG. 13 can sense a response signal that is composite response of the first and second eddy currents.

At block 1408, the method 1400 can include extracting, using a back-end circuit coupled with the at least one third interface coil, a lift-off signal and a defect signal from the response signal. For example, the back-end circuit 1320 of FIG. 13, which is coupled with one or more third interface coils 1318A, 1318B, can extract a lift-off signal and a defect signal from the response signal. The back-end circuit can include an ADC circuit, a demodulator circuit, and a processor, such as shown in FIG. 13.

In some examples, the method 1400 can include determining, based on the lift-off signal and the defect signal, a lift-off independent defect signal. In this manner, the method 1400 can generate a uniform defect signal amplitude without regard to the inspection lift-off.

Various Notes

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The claimed invention is:

1. A lift-off compensated multi-frequency eddy current system for indicating a flaw in a material under test, the system comprising:
   an eddy current probe having a set of interface coils, the set of interface coils including:
   at least one first interface coil arranged to induce a first eddy current in the material in response to a first input excitation signal frequency;
   at least one second interface coil arranged to induce a second eddy current in the material in response to a second input excitation frequency that is different from the first input excitation frequency, wherein the first and the second input excitation frequencies are applied to the at least one first interface coil and the at least one second interface coil concurrently; and
   at least one third interface coil arranged to sense a response signal, wherein the response signal is a composite response to the first eddy current and the second eddy current; and
   a back-end circuit coupled with the at least one third interface coil, the back-end circuit to:
   receive the response signal; and
   extract a lift-off signal and a defect signal from the response signal.

2. The system of claim 1, wherein:
   the at least one first interface coil is arranged in an orthogonal configuration with the at least one third interface coil to provide at least one orthogonal channel; and
   the at least one second interface coil is arranged in an absolute configuration with the at least one third interface coil to provide at least one absolute channel.

3. The system of claim 1, wherein the first and second input excitation frequencies are applied to at least one first interface coil and at least one second interface coil concurrently.

4. The system of claim 1, wherein the set of interface coils includes overlapping coils configured as driver and receiver coils.

5. The system of claim 1, wherein the back-end circuit includes or is coupled with a demodulator, wherein an analog-to-digital converter (ADC) is coupled with receive the response signal, and wherein the demodulator is coupled with an output of the ADC and configured to receive a digital response signal from the ADC to digitally extract the lift-off signal and the defect signal from the digital response signal.

6. The system of claim 5, including or coupled with a processor, the processor to:
   determine, based on the lift-off signal and the defect signal, a lift-off independent defect signal.

7. The system of claim 1, wherein the set of interface coils includes at least one orthogonal sensor and at least one absolute sensor.

8. A multi-frequency method for indicating a flaw in a material under test, the method comprising:
   using at least one first interface coil, inducing a first eddy current in the material under test in response to a first input excitation signal frequency;
   using at least one second interface coil, inducing a second eddy current in the material under test in response to a second input excitation frequency that is different from the first input excitation frequency, wherein the first and the second input excitation frequencies are applied to the at least one first interface coil and the at least one second interface coil concurrently;

using at least one third interface coil, sensing a response signal, wherein the response signal is a composite response to the first eddy current and the second eddy current; and extracting, using a back-end circuit coupled with the at least one third interface coil, a lift-off signal and a defect signal from the response signal.

9. The method of claim 8, comprising:

applying the first and second input excitation frequencies concurrently to the at least one first interface coil and at least one second interface coil, respectively.

10. The method of claim 8, comprising:

determining, based on the lift-off signal and the defect signal, a lift-off independent defect signal.

\* \* \* \* \*